Dec. 10, 1946.  F. P. SOLLINGER  2,412,365
VARIABLE TURBINE NOZZLE
Filed Oct. 26, 1943
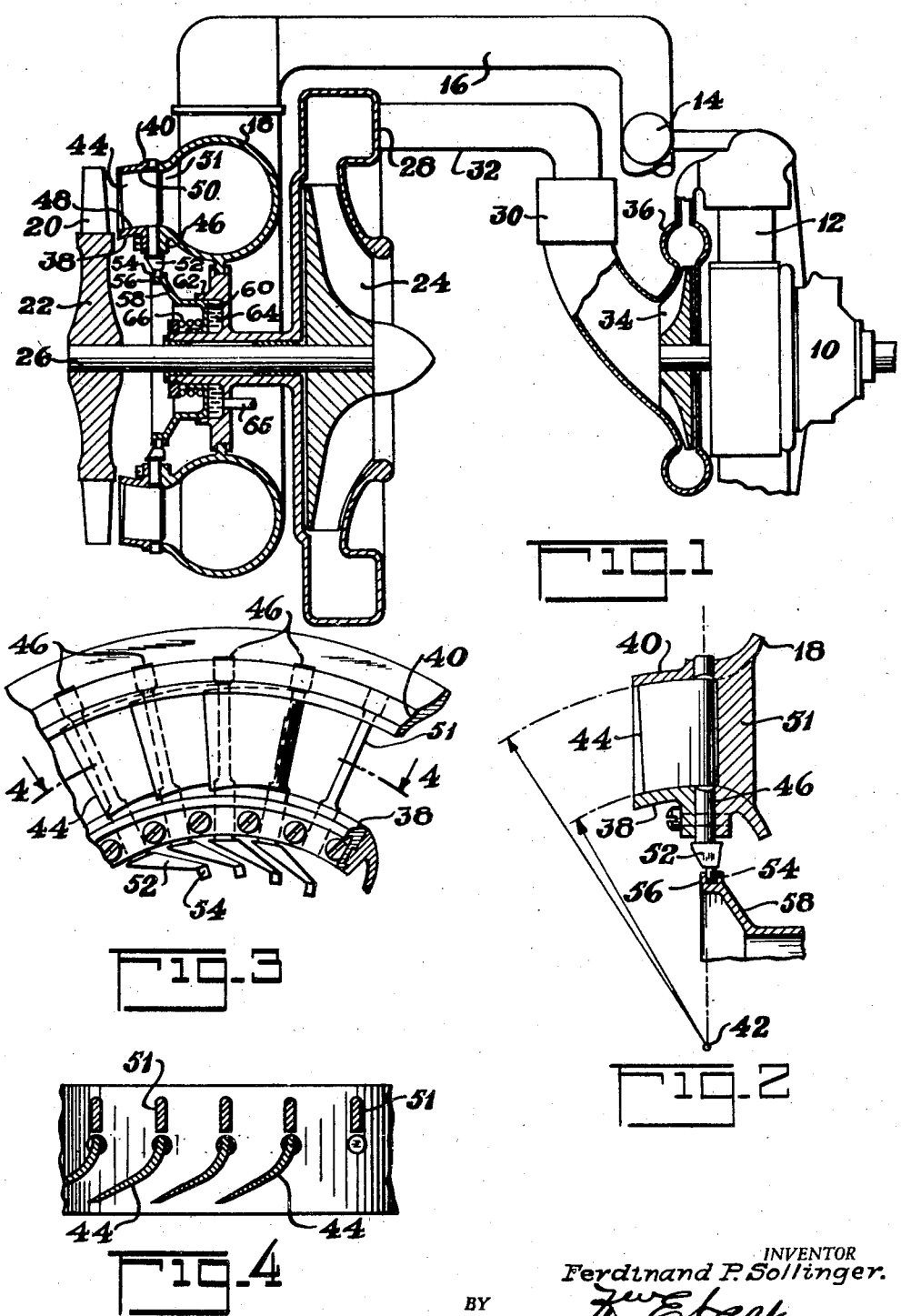
INVENTOR
Ferdinand P. Sollinger.
BY
ATTORNEY Patented Dec. 10, 1946

2,412,365

UNITED STATES PATENT OFFICE 2,412,365

VARIABLE TURBINE NOZZLE

Ferdinand P. Sollinger, Paterson, N. J., assignor to Wright Aeronautical Corporation, a corporation of New York Application October 26, 1943, Serial No. 507,762

2 Claims. (Cl. 253—78)

This invention relates to turbines and is directed to a new and improved adjustable turbine-nozzle construction which is particularly suitable for use with a turbo-supercharger installation for an internal combustion engine.

In the conventional turbo-supercharger installation for aircraft engines, the turbines are designed with a fixed nozzle area and with a waste gate in the engine exhaust for controlling the turbine power output. With such a construction, in order that the turbine maintain a desired engine intake manifold pressure over the desired altitude and power range, it is necessary to design the turbine with a sufficiently small nozzle to insure delivery of the required power output under the most exacting conditions. Then at higher altitudes and higher engine powers, a considerable portion of the power in the engine exhaust is wasted or discharged through the engine exhaust waste gate.

This waste results from the fact that with a fixed turbine nozzle the available power from the engine exhaust gases increases at a greater rate with increase in altitude than the increase in power required by the supercharger to maintain a given engine intake manifold pressure. Also, with a fixed turbine nozzle the power available in the engine exhaust increases approximately as the 2.5 power of the quantity of the engine charge, while the power required by the supercharger increases approximately only linearly with the charge. Therefore, the fixed turbine nozzle must be designed to provide sufficient turbine power output at the lower range of engine power and altitude operation. Then, at either higher altitudes or upon increase in engine power or both the power available in the engine exhaust will be considerably more than required by the turbine to maintain a given engine intake manifold pressure. That is, in an actual fixed nozzle turbo-supercharger aircraft engine installation, the turbo-supercharger is designed to maintain a desired engine intake manifold pressure over a desired range of altitude and of engine power operation. This means that the turbine nozzle area must be made sufficiently small to deliver the required power at relatively low altitudes and at low engine power outputs, the extra power available in the engine exhaust gases at higher altitudes and higher engine power outputs being discarded through a so-called engine exhaust waste gate. Obviously, when a portion of the engine exhaust gases is wasted, a higher engine exhaust back pressure is necessary in order to obtain a given turbine power output than if the entire quantity of engine exhaust gases is utilized by the turbine.

The entire quantity of the engine exhaust gases may be utilized if an adjustable turbine nozzle is provided to control the turbine power output. The decrease in engine exhaust back pressure from the use of the entire engine exhaust results in an increase in the power output of the associated internal combustion engine. Accordingly, it is an object of this invention to provide a relatively simple and effective adjustable turbine nozzle. It is a further object of this invention to provide a variable turbine nozzle consisting of a plurality of adjustable vanes disposed between the walls of an annular discharge opening, whereby adjustment of the vanes varies the effective nozzle area. Furthermore, it is an object of this invention to so construct these vanes with their cooperating walls, that the clearance between the vanes and walls does not vary upon adjustment of the vanes. A further object of this invention consists in the provision of a turbo-supercharger installation for an internal combustion engine in which the turbine power output is controlled entirely by a variable turbine nozzle without the use of an engine exhaust waste gate.

Other objects of this invention will become apparent upon reading the annexed detail description in connection with the drawing in which:

Fig. 1 diagrammatically illustrates an internal combustion engine equipped with a turbo-supercharger embodying the invention;

Fig. 2 is an enlarged sectional view through the turbine nozzle;

Fig. 3 is a front view of a portion of a turbine nozzle; and

Fig. 4 is a sectional view along line 4—4 of Fig. 3.

Referring first to Fig. 1 in the drawing, a conventional radial cylinder aircraft engine 10, has a plurality of radially disposed cylinders 12 which discharge their exhaust into a common exhaust manifold 14. A conduit 16 interconnects the exhaust manifold with an annular turbine nozzle box 18. The exhaust gases are discharged from the nozzle box 18 against the buckets 20 of the turbine wheel 22. The turbine wheel is drivably connected to the supercharger impeller 24 by a drive shaft 26 and the impeller 24 operates to deliver engine intake air to an annular manifold 28 from which it is delivered to a carburetor 30 by a duct 32. The air or combustible mixture from the carburetor may be further compressed by an engine-driven supercharger 34 which discharges into an annular intake manifold 36 from which the air or combustible mixture is delivered to the various engine cylinders 12. Obviously the air or combustible mixture may be distributed directly to the engine cylinders from the carburetor instead of through the engine-driven supercharger. The structure so far described is conventional.

The turbine nozzle comprises a pair of annular spherical-shaped walls or shrouds 38 and 40 forming the inner and outer boundary walls of the turbine nozzle. The spherical walls 38 and 40 have a common center on the axis of the turbine, e. g., at 42 as illustrated on Fig. 3. A plurality of spaced, similarly curved vanes 44 are pivotally mounted between the annular spherical walls 38 and 40 about axes extending radially from the center 42 of the spherical boundary walls 38 and 40.

The vanes 44 are each formed with an integral pivot pin 46 at their rear edge which is journaled in suitable openings in the walls 38 and 40. The inner and outer edges 48 and 50, respectively, of each vane preferably comprise spherical surfaces about the center 42 and are closely fitted to the adjacent spherical surfaces of the walls 38 and 40. With this construction, since the pivot axis of each vane passes through the common center of the spherical walls, the vanes are free to pivot about their axes while still maintaining a close fit with the adjacent spherical surface of the walls 38 and 40. Substantially rectangular interconnecting webs 51 are cast or formed integral with the nozzle box 18 immediately ahead or upstream of each vane 44 in order to prevent distortion of the nozzle.

The inner end of each pivot pin 46 is provided with a crank-arm 52 having a depending pin 54 received within an annular groove 56 in a collar 58. In this way axial adjustment of the collar 58 serves to rotate each of the crankarms 52 and their associated vanes 44, thereby simultaneously adjusting the angular position of each of the vanes. Obviously, the angular position of the vanes determines the effective width of a nozzle opening between them; that is, the adjustment of the vanes determines the effective nozzle area. Thus, rotation of the vanes 44 in the direction of their curvature decreases the effective nozzle area between the vanes 44, and rotation of the vanes in the opposite direction increases the effective nozzle area.

The annular collar 58 terminates in an annular piston 60 disposed about the shaft 26. The piston 60 is received within an annular cylinder 62 to which fluid 64 is controllably supplied under pressure through a conduit 65 to urge the piston to the left for decreasing the nozzle area. This movement of the piston is opposed by the pressure differential across the nozzle vanes 44. If desired, a spring 66 may also be provided for opposing movement of the piston 60 to the left. The pressure of the fluid within the cylinder 62 may be manually controlled or any suitable automatic pressure regulator may be used, e. g., the fluid pressure 64 behind piston 60 may be automatically operated in a manner as taught by Patent No. 2,283,175 to Berger which discloses an automatically adjustable piston for controlling the position of a waste gate for a turbine nozzle box. However, the particular means for controlling fluid pressure 64 forms no part of the present invention.

With the above described adjustable turbine nozzle, if an increase in turbine power output is necessary in order to maintain a desired engine intake manifold pressure or in order to increase this pressure, the piston 60 is adjusted to the left against the pressure differential across the vanes 44 for simultaneously adjusting all the vanes in a direction to decrease the effective nozzle area between them, thereby increasing the discharge velocity of the exhaust gases through the turbine nozzle and accordingly increasing the power output of the turbine. Similarly, if a decrease in the power output of the turbine is desired, the piston 60 is adjusted to the right to increase the effective nozzle area between the vanes 44, thereby decreasing the discharge velocity of the exhaust gases through the turbine nozzle. In other words, the manifold pressure and power output of the internal combustion engine may be controlled through a desired range by adjustment of the effective turbine nozzle area while, at the same time, utilizing the entire engine exhaust through the turbine. In this way the engine exhaust back pressure is kept at a minimum value.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A turbine nozzle comprising a pair of annular walls defining an annular turbine nozzle opening therebetween, the facing surfaces of said walls comprising spherical zones having a common center, a plurality of circumferentially spaced vanes disposed about said annular nozzle opening between said walls, each of said vanes having radially spaced inner and outer circular edges fitted to the adjacent spherical wall surfaces and being pivotally mounted about an axis adjacent to the upstream end of each vane, the pivot axis of each of said vanes passing through said common center, and a plurality of fixed web portions radially disposed across said nozzle opening immediately upstream of said vanes and of substantially the same thickness as said vanes.

2. A turbine nozzle comprising a pair of radially spaced annular walls defining an annular turbine nozzle opening therebetween, the facing surfaces of said walls comprising spherical zones having a common center, a plurality of circumferentially spaced vanes disposed about said nozzle opening between said walls, each of said vanes being mounted for pivotal adjustment about an individual axis disposed adjacent to the upstream end of said vane and passing through said common center, each of said vanes having radially spaced inner and outer edges defining concentric circular arcs about said common center, each of said arcs having a curvature substantially equal to the curvature of the adjacent spherical zone, and a plurality of circumferentially spaced fixed web portions radially disposed across said nozzle opening immediately upstream of said vanes.

FERDINAND P. SOLLINGER.